US010667125B1

(12) United States Patent
Steeley et al.

(10) Patent No.: US 10,667,125 B1
(45) Date of Patent: May 26, 2020

(54) ON-DEVICE ACTIVATION OF MOBILE COMPUTING DEVICES

(71) Applicants: AT&T INTELLECTUAL PROPERTY I, L.P., Atlanta, GA (US); AT&T MOBILITY II LLC, Atlanta, GA (US); CRICKET WIRELESS LLC, Atlanta, GA (US)

(72) Inventors: Tina Steeley, Atlanta, GA (US); Dennis Duffy, Decatur, GA (US); Vadim Nerovnia, Cumming, GA (US); Kenneth Hughes, Dunwoody, GA (US); Andre Lakhansingh, Woodstock, GA (US); Derek Baylor, Mableton, GA (US); Umair Rabbani, Atlanta, GA (US); Jacqueline Levy Johnson, Atlanta, GA (US); Chris Denton Morris, Atlanta, GA (US); Elizabeth Petronella Grimbergen, Decatur, GA (US)

(73) Assignees: AT&T INTELLECTUAL PROPERTY, L.P., Atlanta, GA (US); CRICKET WIRELESS LLC, Atlanta, GA (US); AT&T MOBILTY II LLC, Atlanta, GA (US)

( * ) Notice: Subject to any disclaimer, the term of this patent is extended or adjusted under 35 U.S.C. 154(b) by 0 days.

(21) Appl. No.: 16/378,293

(22) Filed: Apr. 8, 2019

Related U.S. Application Data (60) Provisional application No. 62/796,456, filed on Jan. 24, 2019.

(51) Int. Cl.
*H04W 4/14* (2009.01)
*H04W 8/24* (2009.01)
*H04M 1/725* (2006.01)

(52) U.S. Cl.
CPC ....... *H04W 8/245* (2013.01); *H04M 1/72561* (2013.01); *H04W 4/14* (2013.01)

(58) Field of Classification Search
CPC ............ H04M 4/50; H04M 4/14; H04M 4/60; H04M 8/18; H04M 12/06; H04M 4/21; H04M 4/23; H04M 8/265; H04M 4/24
See application file for complete search history.

(56) References Cited

U.S. PATENT DOCUMENTS 6,628,934 B2   9/2003 Rosenberg
7,305,090 B1   12/2007 Hayes
(Continued)

FOREIGN PATENT DOCUMENTS

EP   1361775 A1   11/2012
WO   0115096 A1   3/2001

OTHER PUBLICATIONS

Rohini P.P., "Over-the-air provisioning in CDMA", Gemplus Technologies, Oct. 2004, 7 pages, Oct. 2004.
(Continued)

*Primary Examiner* — Jean A Gelin
(74) *Attorney, Agent, or Firm* — Baker Botts, LLP (57) ABSTRACT

Methods, systems, and computer programs encoded on computer storage media, for receiving, from a mobile device, a request to register with a mobility network, the mobile device including a partially-activated subscriber identification module (SIM); determining that the partially-activated SIM qualifies for on-device activation; in response to determining that the partially-activated SIM qualifies for on-device activation, providing a short message service (SMS) message to the mobile device through the mobility network, the SMS message including a uniform resource locator (URL); in response to activation of the URL, providing, to the mobile device, access to an activation portal web page associated with the URL, wherein SIM data and (Continued)

device data are automatically provided to the activation portal web page; and receiving, from the mobile device, activation data, and in response, activating the SIM and provisioning the mobile device within the mobility network.

20 Claims, 5 Drawing Sheets (56) References Cited

U.S. PATENT DOCUMENTS

| | | | |
|---|---|---|---|
| 7,548,746 B2* | 6/2009 | Kalke | G06Q 30/012 |
| | | | 455/418 |
| 7,844,263 B2 | 11/2010 | Marsh | |
| 7,957,728 B2 | 6/2011 | Kalke | |
| 8,428,570 B2 | 4/2013 | De | |
| 8,694,055 B1* | 4/2014 | Ashrafi | H04L 67/16 |
| | | | 455/558 |
| 8,811,983 B2 | 8/2014 | Zimmerman | |
| 8,849,278 B2 | 9/2014 | Bush et al. | |
| 8,862,115 B2 | 10/2014 | Macaluso | |
| 8,923,838 B1 | 12/2014 | Bush et al. | |
| 8,948,726 B2 | 2/2015 | Smith et al. | |
| 8,966,383 B2 | 2/2015 | Gautier et al. | |
| 8,971,855 B2 | 3/2015 | Jackson et al. | |
| 9,392,457 B2 | 7/2016 | Laden et al. | |
| 9,641,957 B2 | 5/2017 | Raleigh | |
| 9,854,426 B1 | 12/2017 | Wang et al. | |
| 9,990,209 B2 | 6/2018 | Stein | |
| 10,111,086 B2 | 10/2018 | Hjelt | |
| 2002/0153410 A1 | 10/2002 | Santini | |
| 2006/0035631 A1 | 2/2006 | White | |
| 2010/0285834 A1 | 11/2010 | Hutchison | |
| 2011/0159843 A1 | 6/2011 | Heath | |
| 2013/0132854 A1* | 5/2013 | Raleigh | G06F 3/0482 |
| | | | 715/738 |
| 2013/0196647 A1* | 8/2013 | Raleigh | H04W 12/06 |
| | | | 455/418 |
| 2014/0024361 A1* | 1/2014 | Poon | H04W 12/06 |
| | | | 455/419 |
| 2014/0045474 A1* | 2/2014 | Cheuk | H04W 8/265 |
| | | | 455/418 |
| 2014/0199962 A1* | 7/2014 | Mohammed | H04M 15/70 |
| | | | 455/406 |
| 2014/0310283 A1* | 10/2014 | Laligand | G06Q 30/00 |
| | | | 707/737 |
| 2015/0181364 A1* | 6/2015 | Chen | H04W 4/50 |
| | | | 455/418 |
| 2015/0181419 A1* | 6/2015 | Mistry | G06F 9/445 |
| | | | 455/419 |
| 2016/0344872 A1 | 11/2016 | Mathison | H04M 15/715 |
| 2017/0048645 A1* | 2/2017 | Yerrabommanahalli | |
| | | | H04L 61/106 |
| 2018/0041855 A1* | 2/2018 | Chen | H04L 63/0853 |
| 2019/0149965 A1* | 5/2019 | Jahr | H04W 8/245 |

OTHER PUBLICATIONS

Marc Richarme, "Virtual SIM", Masters Thesis, Technical University of Denmark (DTU) (2008), 158 pages, Apr. 21, 2008.

* cited by examiner

ON-DEVICE ACTIVATION OF MOBILE COMPUTING DEVICES

CROSS-REFERENCE TO RELATED APPLICATIONS

This application claims the benefit of U.S. Prov. Ser. No. 62/796,456 filed on Jan. 24, 2019, the disclosure of which is expressly incorporated herein by reference in its entirety.

TECHNICAL FIELD

The disclosure relates generally to activation of a mobile computing device for use within a mobility network, and specifically, on-device activation of the mobile computing device.

BACKGROUND

Wireless communication devices, such as mobile devices, provide wireless communication services, such as voice communication, data communication or both, via a wireless communication network are increasingly prevalent in society.

Wireless communication services are typically provided on a service contract basis where a subscriber (e.g., a wireless device user) enters a service contract with a wireless carrier to have wireless services provided to the subscriber's equipment: the wireless communication device. To enable such services, the carrier's wireless communication system is configured with subscriber data, such as, but not limited to, subscriber name and billing information, wireless service plan, subscriber's equipment type, and any required information to identify the subscriber's equipment to facilitate wireless communication. The activity of configuring the wireless communication network with such information to enable services is sometimes referred to as network service provisioning. Configuring a wireless device with device enabling information is sometimes referred to as device provisioning.

In a competitive business environment, such as providing wireless services, enrolling or signing-up subscribers is a major focus of carrier activities. Often one or more networks of re-sellers or contract agents work on behalf of the carrier to enroll customers. One aspect of the enrollment procedure is for a customer service representative (CSR) to obtain subscriber information. The CSR then provides the information to the carrier to activate the subscriber's account and enable the wireless services. The CSR may provide the information via a telephone interface to the carrier or electronically through a Web-based interface.

SUMMARY

According to an embodiment, a method includes receiving, from a mobile device, a request to register with a mobility network, the mobile device including a partially-activated subscriber identification module (SIM); determining that the partially-activated SIM qualifies for on-device activation; in response to determining that the partially-activated SIM qualifies for on-device activation, providing a short message service (SMS) message to the mobile device through the mobility network, the SMS message including a uniform resource locator (URL); in response to activation of the URL, providing, to the mobile device, access to an activation portal web page associated with the URL, wherein SIM data and device data are automatically provided to the activation portal web page; and receiving, from the mobile device, activation data, and in response, activating the SIM and provisioning the mobile device within the mobility network.

According to another embodiment, a non-transitory computer-readable medium storing software comprising instructions executable by one or more computers which, upon such execution, cause the one or more computers to perform operations including receiving, from a mobile device, a request to register with a mobility network, the mobile device including a partially-activated subscriber identification module (SIM); determining that the partially-activated SIM qualifies for on-device activation; in response to determining that the partially-activated SIM qualifies for on-device activation, providing a short message service (SMS) message to the mobile device through the mobility network, the SMS message including a uniform resource locator (URL); in response to activation of the URL, providing, to the mobile device, access to an activation portal web page associated with the URL, wherein SIM data and device data are automatically provided to the activation portal web page; and receiving, from the mobile device, activation data, and in response, activating the SIM and provisioning the mobile device within the mobility network According to yet another embodiment, a system comprising a processor having access to memory media storing instructions executable by the processor to perform operations including receiving, from a mobile device, a request to register with a mobility network, the mobile device including a partially-activated subscriber identification module (SIM); determining that the partially-activated SIM qualifies for on-device activation; in response to determining that the partially-activated SIM qualifies for on-device activation, providing a short message service (SMS) message to the mobile device through the mobility network, the SMS message including a uniform resource locator (URL); in response to activation of the URL, providing, to the mobile device, access to an activation portal web page associated with the URL, wherein SIM data and device data are automatically provided to the activation portal web page; and receiving, from the mobile device, activation data, and in response, activating the SIM and provisioning the mobile device within the mobility network.

Technical advantages of this disclosure may include the following. A technical advantage may include decreased network traffic as on-device activation streamlines the number of communications steps needed to activate a mobile computing device within a mobility network. Specifically, communication round trips between the mobile computing device and an activation center (e.g., an on-demand customer service activation department) is decreased as the mobile computing device is able to communicate directly with the activation server and the mobility network for on-device activation of the mobile computing device.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Partially-activated subscriber identification modules (SIMs) can provide on-device activation of mobile computing devices (e.g., cell phones, smart devices, tablet computing devices). Specifically, the partially-activated SIM can facilitate providing the mobile computing device with "walled garden" data access over a mobility network. The mobility network can support a specific URL that the mobile computing device can access in the "walled garden" to establish network services for the mobile computing device. Thus, a customer can set up network service on the device and will not need to call customer service or go online to establish such service.

Specifically, this disclosure describes methods, systems, and computer readable medium for receiving, from a mobile device, a request to register with a mobility network. The mobile device can include a partially-activated SIM. It is determined that the partially-activated SIM qualifies for on-device activation. In response to determining that the partially-activated SIM qualifies for on-device activation, a short message service (SMS) message is provided to the mobile device through the mobility network. The SMS message includes a uniform resource locator (URL). In response to activation of the URL, access is provided to the mobile device to an activation portal web page associated with the URL. SIM data and device data are automatically provided to the activation portal web page. Activation data is received from the mobile device, and in response, the SIM is activated and the mobile device is provisioned within the mobility network.

Figure 1:
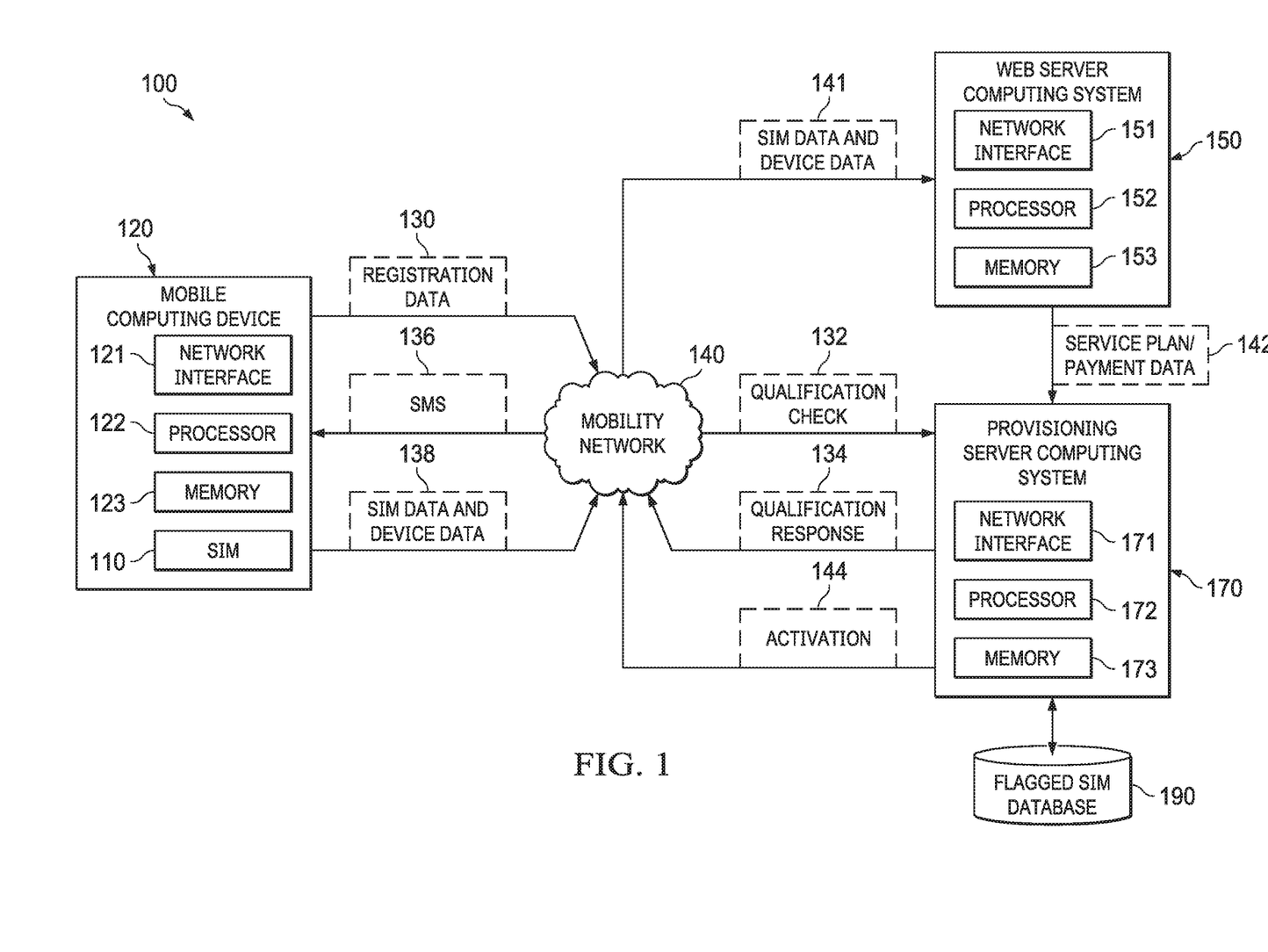
FIG. 1 illustrates a block diagram of an environment for on-device activation of a mobile computing device.
Figure 2A:
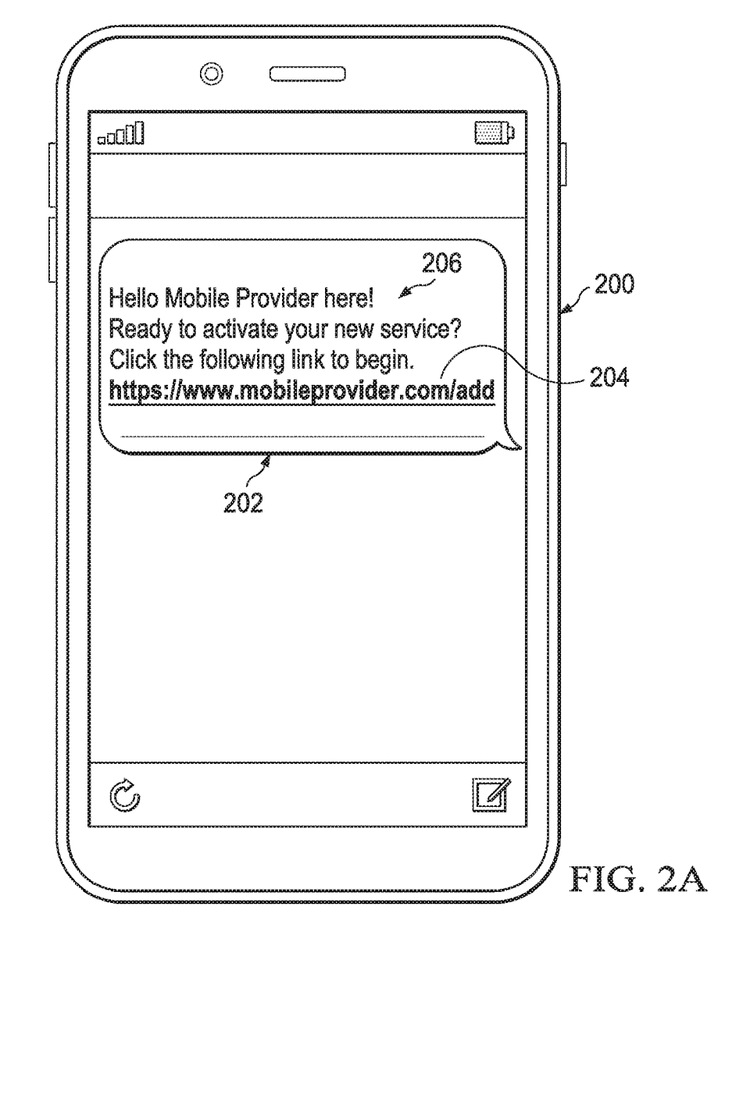
FIGS. 2A-2E illustrate a graphical user interface of the mobile computing device.
Figure 2B:
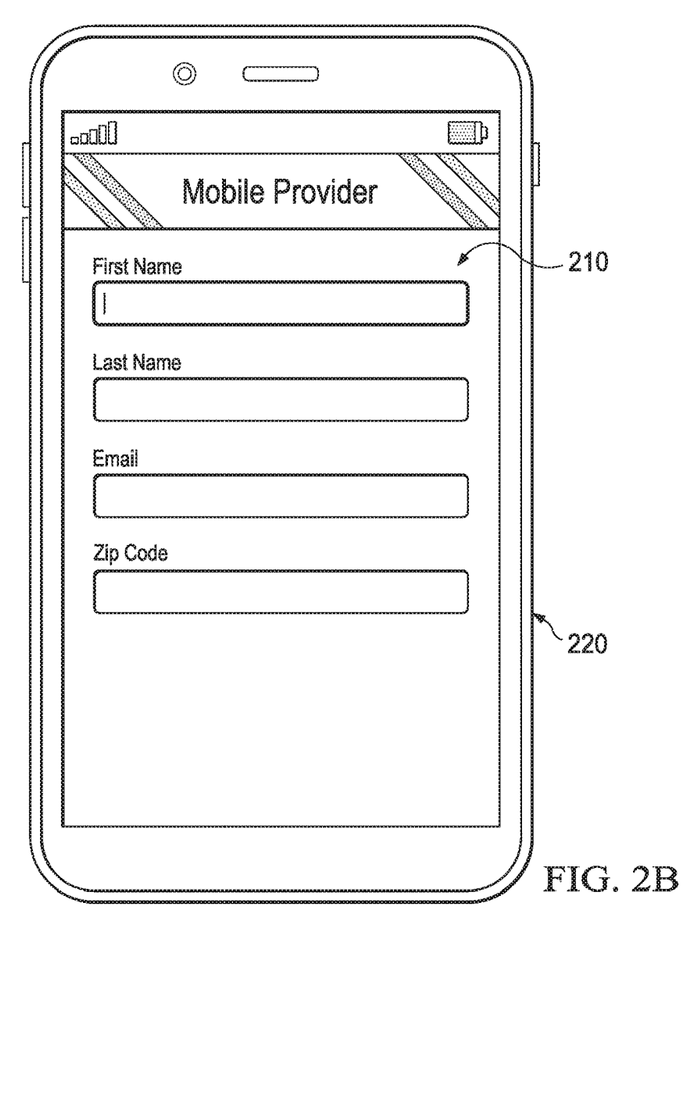
Figure 2C:
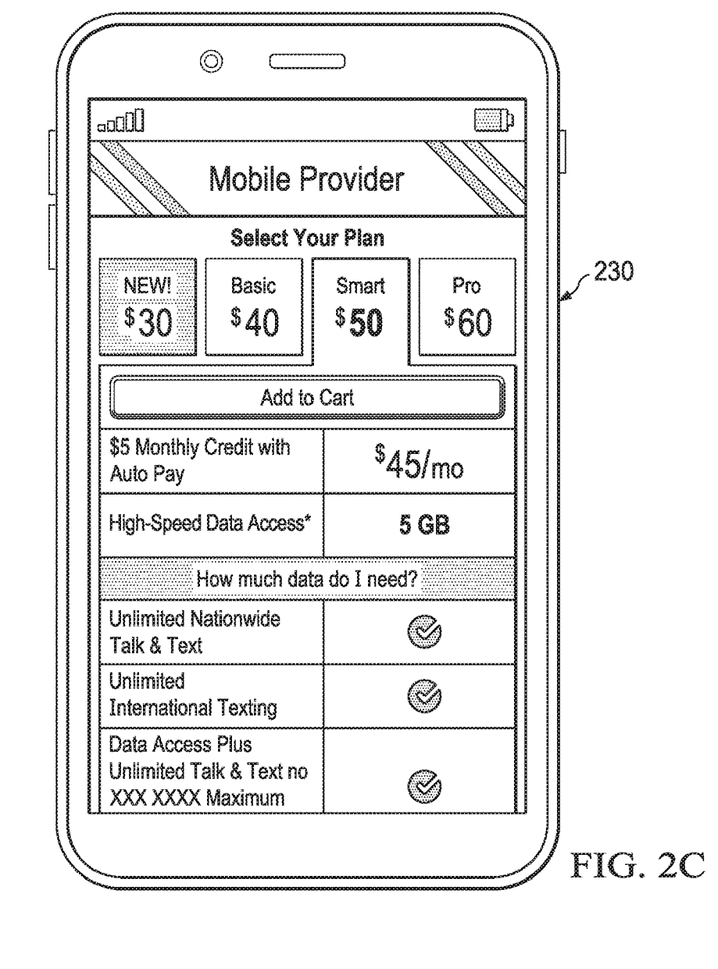
Figure 2D:
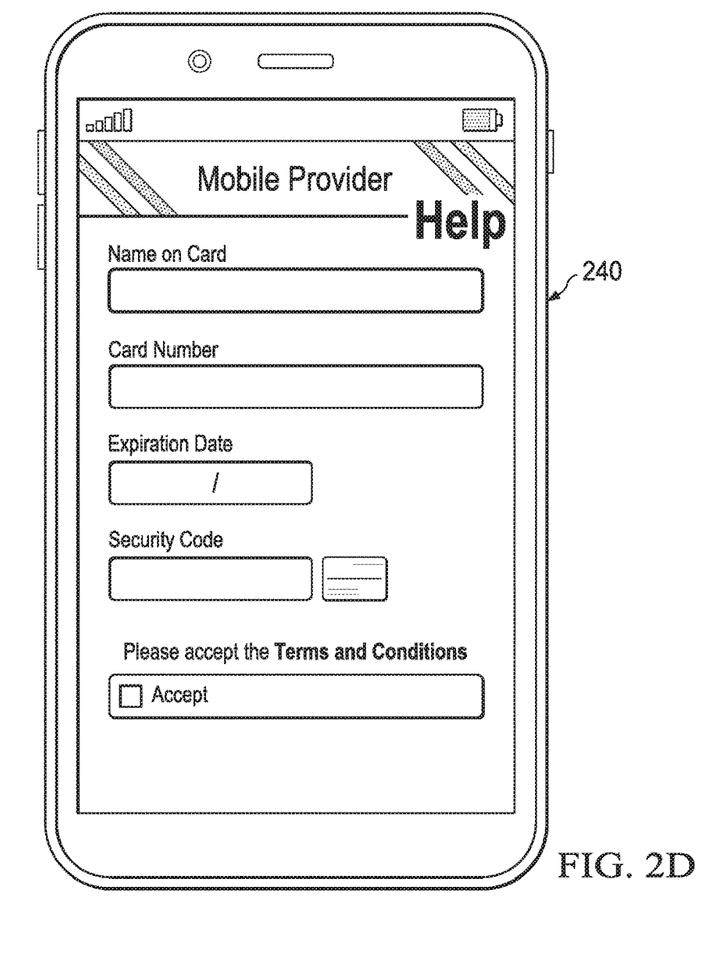
Figure 2E:
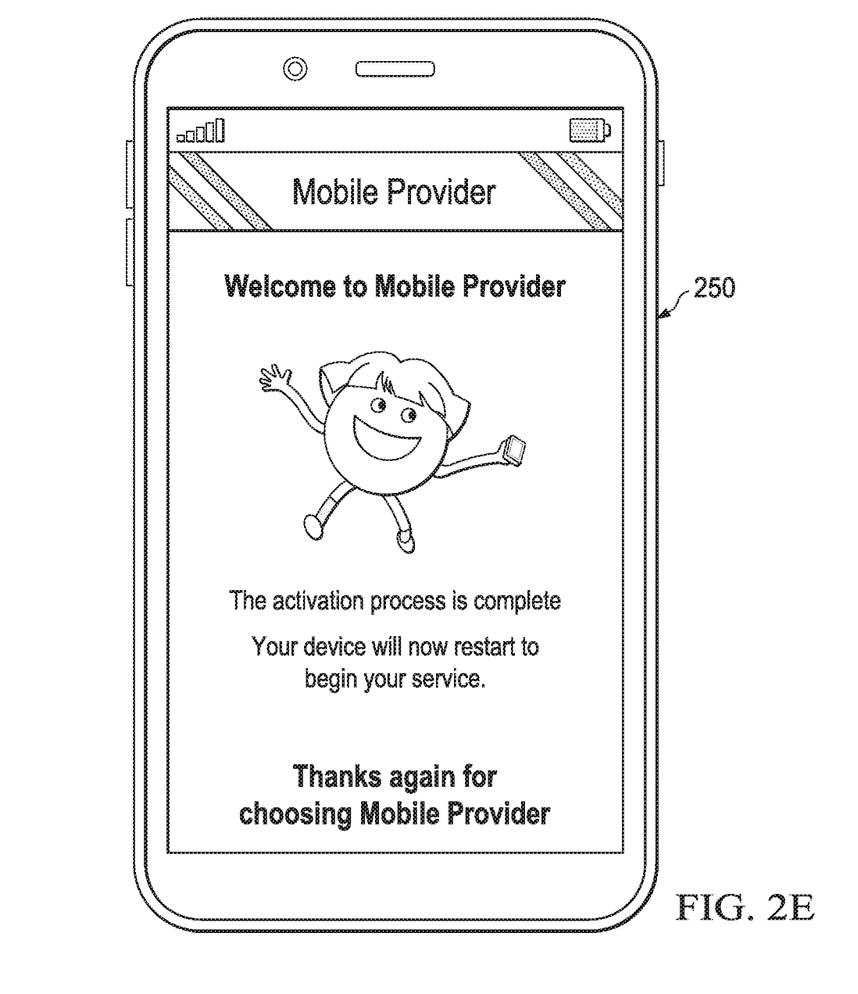
Figure 3:
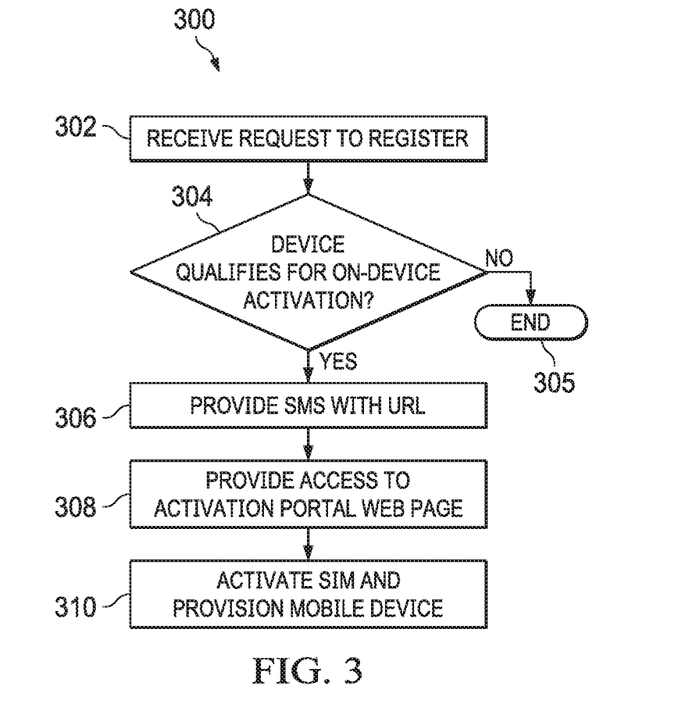
FIG. 3 illustrates a flowchart for on-device action of the mobile computing device.
Figure 4:
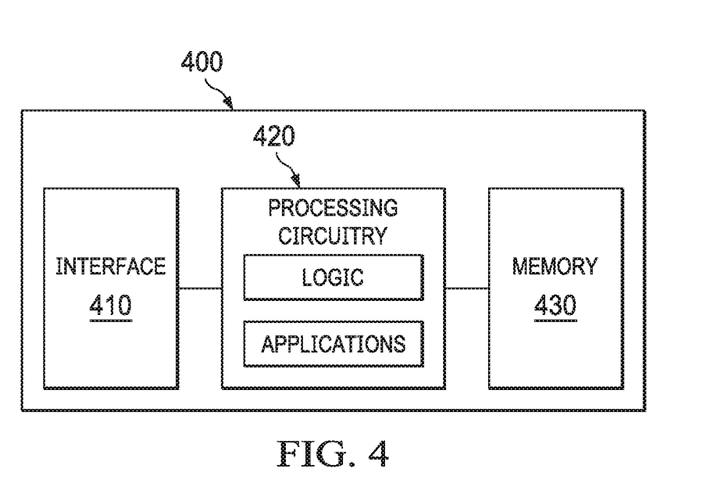
FIG. 4 illustrates an example computing system that may be used to implement the techniques described herein.

FIGS. 1 through 4 show example systems and methods for on-device activation of a mobile computing device. FIG. 1 shows a block diagram of an environment for on-device activation of the mobile computing device. FIGS. 2A-2E illustrate a graphical user interface of the mobile computing device. FIG. 3 illustrates a flowchart on-device activation of the mobile computing device. FIG. 4 shows an example computer system that may be used by the systems and methods described herein.

FIG. 1 illustrates a block diagram of an environment 100 for on-device activation of a mobile computing device. Environment 100 includes a mobility network 140, a mobile computing device 120, a web server computing system 150, a provisioning server computing system 170, and a flagged SIM database 190. Although FIG. 1 illustrates a particular arrangement of the mobile computing device 120, the web server computing system 150, the provisioning server computing system 170, and the flagged SIM database 190, this disclosure contemplates any suitable arrangement of the mobile computing device 120, the web server computing system 150, the provisioning server computing system 170, and the flagged SIM database 190. As an example and not by way of limitation, two or more of the mobile computing device 120, the web server computing system 150, the provisioning server computing system 170, and the flagged SIM database 190 may be connected to each other directly, bypassing network 140. As another example, two or more of the mobile computing device 120, the web server computing system 150, the provisioning server computing system 170, and the flagged SIM database 190 may be physically or logically co-located with each other in whole or in part. Moreover, although FIG. 1 illustrates a particular number of the mobile computing device 120, the web server computing system 150, the provisioning server computing system 170, and the flagged SIM database 190, this disclosure contemplates any suitable number of the mobile computing device 120, the web server computing system 150, the provisioning server computing system 170, and the flagged SIM database 190. As an example and not by way of limitation, network environment 100 may include multiple of the mobile computing device 120, the web server computing system 150, the provisioning server computing system 170, and the flagged SIM database 190.

Mobile computing device 120 can facilitate communication over the mobility network 140. In the illustrated embodiment, mobile computing device 120 includes network interface 122, processor 124, and memory 126. Network interface 122 facilitates communication between processor 124, network 140, or other components of network environment 100. Network interface 122 may facilitate communication over portions of network 140 or over a separate data network. Mobile computing device 120 can further include, or have access to, a partially activated SIM 110.

Processor 124 may represent or include any form of processing components, including dedicated microprocessors, general-purpose computers, or other devices capable of processing electronic information. Examples of processor 124 include field-programmable gate arrays (FPGAs), programmable microprocessors, digital signal processors (DSPs), application-specific integrated circuits (ASICs), and any other suitable specific- or general-purpose processors. Although FIG. 1 illustrates, for the sake of simplicity, an embodiment of mobile computing device 120 that includes a single processor 124, mobile computing device 120 may include any number of processors 124 configured to interoperate in any appropriate manner.

Memory 126 stores processor instructions and/or any other data utilized by mobile computing device 120 during operation. Memory 126 may comprise any collection and arrangement of volatile or non-volatile, local or remote devices suitable for storing data, such as random access memory (RAM), read only memory (ROM), magnetic storage, optical storage, or any other suitable type of data storage components. For example, memory 126 may store an authorization policy setting and an authorized user group setting associated with one or more users. Although shown as a single element in FIG. 1, memory 126 may include one or more physical components local to or remote from mobile computing device 120.

Web server computing system 150 can facilitate providing an activation portal web page for activation of the SIM 110 and provisioning of the mobile computing device 120. Web server computing system 150 may include a network interface 151, a processor 152, and a memory 153, similar to network interface 122, processor 124, and memory 126, respectively, of the mobile computing device 120. Web server computing system 150 may be in communication with mobile computing device 120 over mobility network 140. Web server computing system 150 may be in communication with provisioning server computing system 170 over mobility network 140 or other communication means.

Provisioning server 170 can facilitate activation of the SIM 110 and provisioning of the mobile computing device 120. Provisioning server computing system 170 can include a network interface 171, a processor 172, and a memory 173, similar to network interface 122, processor 124, and memory 126, respectively, of mobile computing device 120. Provisioning server computing system 170 may be in communication with mobile computing device 120 over mobility network 140. Provisioning server computing system 170 may be in communication with web server computing system 150 over mobility network 140 or other communication means. Provisioning server computing system 170 can also be in communication with flagged SIM database 190.

This disclosure contemplates any suitable mobility network 140. As an example and not by way of limitation, one or more portions of mobility network 140 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a combination of two or more of these, or any suitable type of network. Mobility network 140 may include one or more networks.

In an exemplary embodiment of operation, the environment 100 can facilitate implementing the partially-activated SIM 110 with the mobile computing device 120 such that the mobile computing device 120 has "walled garden" data access (e.g., over the mobility network 140) to support a specific URL that a user of the mobile computing device 120 can access to establish network service for the mobile computing device 120.

Specifically, the mobile computing device 120 can register with the mobility network 140. As previously discussed, the mobile computing device 120 can include, or have access to, the partially activated SIM 110. To that end, the mobile computing device 120 registers with the mobility network 140 using the SIM 110. The mobile computing device 120 can register with the mobility network 140 upon coupling the SIM 110 with the mobile computing device 120 and/or upon the mobile computing device 120 accessing the SIM 110. The mobile computing device 120 can register with the mobility network 140 automatically, or in response to user input. In some examples, when registering the mobile computing device 120 with the mobility network, the mobile computing device 120 provides registration data 130 identifying the SIM 110, e.g., a SIM identifier such as the integrated circuit card identifier (ICCID) of the SIM 110.

The mobility network 140 can communicate with the provisioning server computing system 170 to perform a qualification check 132 for on-device activation of the mobile computing device 120. Specifically, the provisioning server computing system 170 determines whether the SIM 110 qualifies for on-device activation. In some examples, specific groups of SIMs (from a large quantity of SIMs) are available for on-device activation. For example, SIMs that are provided at retail locations (big-box stores) are typically qualified for on-device activation; while SIMs that are provided at retailers associated with the provisioning server computing system 170 may not be qualified for on-device activation. However, the SIM 110 can be qualified for on-device activation based on any number of factors desired.

In some examples, the provisioning server computing system 170 can determine that the SIM 110 qualifies for on-device activation using the flagged SIM database 190. Specifically, the provisioning server computing system 170 compares an identifier of the SIM 110 (e.g., the ICCID) with a table stored by the flagged SIM database 190. For example, the flagged SIM database 190 can include a table that stores data identifying SIMs that qualify for on-device activation (e.g., a whitelist). The provisioning server computing system 170, based on the comparing, can identify a match between the identifier of the SIM 110 and the data identifying SIMs that qualify for on-device activation (e.g., from the flagged SIM database 190). The provisioning server computing system 170, based on the match, can determine that the SIM 110 qualifies for on-device activation. The provisioning server computing system 170 can provide a qualification response 134 to the mobility network—confirming that the SIM 100 qualifies for on-device activation.

In response to determining that the SIM 110 qualifies for on-device activation, the mobility network 140 can provide a SMS message 136 to the mobile computing device 120. Specifically, the provisioning server computing system 170 can communicate with the mobility network 140 such that the mobility network 140 sends a SMS message 136 to the mobile computing device 120 in response to determining that the SIM 110 qualifies for on-device activation. The SMS message 136 can include an encrypted uniform resource locator (URL). Specifically, the mobility network 140 can provide the SMS message 136 to the mobile computing device 120 that includes a web link (URL) to an activation portal web page.

FIG. 2A illustrates a graphical user interface (GUI) 200 of the mobile computing device 120 that provides for display a SMS message 202 that includes a URL 204. The SMS message 202 can additionally include text 206 related to the URL 204 and on-device activation of the SIM 110. SMS message 202 may be the first messaged received by the mobile computing device 120 to begin the on-device activation.

The user can select the web link and activate the URL and in response, a web browser application enabled by the mobile computing device 120 can launch that is directed to the activation portal web page. Specifically, in response to activation of the URL, the mobility network 140 provides access to the activation portal web page that is associated with the URL.

FIG. 2B illustrates a GUI 220 that provides for display an activation portal web page 210. The activation portal web page 210 can include fields for entering identifying information of the user, such as first name, last name, email address, and zip code.

Furthermore, in response to activation of the URL, the mobile computing device 120 automatically transmits SIM data and device data 138 to the mobility network 140, and ultimately to the web server computing system 150 as data 141, e.g., through the activation portal web page 210. Specifically, the activation portal web page 210 can automatically "capture" the SIM data and the device data 138 and provide such to the web server computing system 150 automatically. That is, the SIM data and the device data 138 are automatically provided to the web server computing system 150 by the mobility network 140 through the activation portal web page 210 independent of user interaction (and in response to activation of the URL). In other words, the user of the mobile computing device 120 does not have to enter such information into a field of the activation portal web page 210—e.g., the SIM data and the device data 138 identifiers. In some examples, the SIM data includes an integrated circuit card identifier (ICCID), and the device data includes an international mobile equipment identify (IMEI).

In some examples, access to other web pages and/or Internet network traffic is prevented by the mobility network 140. That is, the mobility network 140 only allows access to the activation portal web page—e.g., walled garden access to the activation portal web page by the mobile computing device 120. The mobile computing device 120 is independent of Internet network access (e.g., prior to activation of the SIM 110 and provisioning of the mobile computing device 120 within the mobility network 140).

In some examples, access to the activation portal web page can include selection of a service plan for use with the mobility network 140 and billing information. Specifically, referring to FIG. 2C, a GUI 230 provides for display multiple service plans that are provided/offered by the provisioning server computing system 170 for access over the mobility network 140. The user of the mobile computing device 120 selects one of the service plans displayed by the GUI 230, and provides billing information, as shown by the GUI 240 of FIG. 2D. The mobile computing device 120 can transmit such service plan/payment data ultimately to the web server computing system 150 through the activation portal web page. The web server computing system 150 can communicate with the provisioning sever computing system 170, including communicating the service plan/payment data 142.

The provisioning computing system 170 can communicate with the mobility network 140 to activate the SIM 110 and provision the mobile computing device 120 for use within the mobility network 140. Specifically, in response to receiving the activation data (e.g., the SIM data and the device data) and the billing information from the web server computing system 150, the provisioning server computing system 170 can activate the SIM 110 and provision the mobile computing device 120 for use within the mobility network 140, shown as activation data 144. FIG. 2E illustrates a GUI 250 after successful activation and provisioning.

FIG. 3 illustrates a flowchart depicting selected elements of an embodiment of a method 300 for on-device activation of the mobile computing device 120. Method 300 may be performed by environment 100 described herein with reference to FIG. 1. It is noted that certain operations described in method 300 may be optional or may be rearranged in different embodiments.

At step 302, a request to register with the mobility network 140 by the mobile computing device 120 is received. In some examples, the mobile computing device 120 registers with the mobility network 140 using the SIM 110.

At step 304, the provisioning server computing system 170 determines whether the SIM 110 qualifies for on-device activation.

At step 305, if the provisioning server computing system 170 determines that the SIM 110 does not qualify for on-device activation, the process ends.

At step 306, in response to determining that the SIM 110 qualifies for on-device activation, the mobility network 140 can provide a SMS message to the mobile computing device 120. The SMS message can include an encrypted URL. Specifically, the mobility network 140 can provide the SMS message to the mobile computing device 120 that includes a web link (URL) to an activation portal web page.

At step 308, in response to activation of the URL, the mobility network 140 provides access to the activation portal web page that is associated with the URL. Furthermore, in response to activation of the URL, the mobile computing device 120 automatically provides SIM data and device data to the web server computing system 150, e.g., through the activation portal web page.

At step 310, in response to receiving the activation data (e.g., the SIM data and the device data) and the billing information from the web server computing system 150, the provisioning server computing system 170 can activate the SIM 110 and provision the mobile computing device 120 for use within the mobility network 140.

Modifications, additions, or omissions may be made to the steps of this embodiment. These steps may be performed in parallel or in any suitable order by any suitable component.

FIG. 4 shows an example computer system that may be used by the systems and methods described herein. For example, any of the mobile computing device 120, the web server computing system 150, the provisioning server computing system 170 of FIG. 1 may include one or more interface(s) 410, processing circuitry 420, memory(ies) 430, and/or other suitable element(s). The computer system of FIG. 4 may have artificial intelligence (AI) and/or machine learning (ML) capabilities.

Interface 410 receives input, sends output, processes the input and/or output, and/or performs other suitable operation. Interface 410 may comprise hardware and/or software.

Processing circuitry 420 performs or manages the operations of the component. Processing circuitry 420 may include hardware and/or software. Examples of processing circuitry include one or more computers, one or more microprocessors, one or more applications, etc. In certain embodiments, processing circuitry 420 executes logic (e.g., instructions) to perform actions (e.g., operations), such as generating output from input. The logic executed by processing circuitry 420 may be encoded in one or more tangible, non-transitory computer readable media (such as memory 430). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 430 (or memory unit) stores information. Memory 430 may comprise one or more non-transitory, tangible, computer-readable, and/or computer-executable storage media. Examples of memory 330 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A computer-implemented method, comprising:
receiving, from a mobile device, a request to register with a mobility network, the mobile device including a partially-activated subscriber identification module (SIM);
determining that the partially-activated SIM qualifies for on-device activation;
in response to determining that the partially-activated SIM qualifies for on-device activation, providing a short message service (SMS) message to the mobile device through the mobility network, the SMS message including a uniform resource locator (URL);
in response to activation of the URL, i) providing, to the mobile device, access to an activation portal web page associated with the URL, wherein SIM data and device data are automatically provided to the activation portal web page, and ii) preventing access by the mobile device to other web pages not including the activation portal web page; and
receiving, from the mobile device, activation data, and in response, activating the SIM and provisioning the mobile device within the mobility network.

2. The computer-implemented method of claim 1, wherein determining that the partially-activated SIM qualifies for on-device activation includes:
comparing an identifier of the partially-activated SIM with a table stored by a database, the table storing data identifying SIMs that qualify for on-device activation;
based on the comparing, identifying a match between the identifier of the partially-activated SIM and data identifying SIMs that qualify for on-device activation; and
based on the match, determining that the partially-activated SIM qualifies for on-device activation.

3. The computer-implemented method of claim 1, wherein the SIM data includes an integrated circuit card identifier (ICCID) and the device data includes an international mobile equipment identify (IMEI).

4. The computer-implemented method of claim 1, further comprising preventing access by the mobile device to the other web pages not including the activation portal web page prior to provisioning the mobile device within the mobility network.

5. The computer-implemented method of claim 1, wherein the SIM data and device data are automatically provided to the activation portal web page in response to activation of the URL and the SIM data and the device data are provided to the activation portal independent of user interaction.

6. The computer-implemented method of claim 1, wherein the mobile device is independent of internet access prior to activating the SIM and provisioning the mobile device within the mobility network.

7. The computer-implemented method of claim 1, further comprising in response to activation of the URL, providing, to the mobile device, access to only the activation portal web page associated with the URL.

8. A system comprising one or more processors and a memory storing instructions that, when executed by the one or more processors, cause the one or more processor to preform operations, comprising:
receiving, from a mobile device, a request to register with a mobility network, the mobile device including a partially-activated SIM;
determining that the partially-activated SIM qualifies for on-device activation;
in response to determining that the partially-activated SIM qualifies for on-device activation, providing a short message service (SMS) message to the mobile device through the mobility network, the SMS message including a URL;
in response to activation of the URL, i) providing, to the mobile device, access to an activation portal web page associated with the URL, wherein SIM data and device data are automatically provided to the activation portal web page, and ii) preventing access by the mobile device to other web pages not including the activation portal web page; and
receiving, from the mobile device, activation data, and in response, activating the SIM and provisioning the mobile device within the mobility network.

9. The system of claim 8, wherein determining that the partially-activated SIM qualifies for on-device activation includes:
comparing an identifier of the partially-activated SIM with a table stored by a database, the table storing data identifying SIMs that qualify for on-device activation;
based on the comparing, identifying a match between the identifier of the partially-activated SIM and data identifying SIMs that qualify for on-device activation; and
based on the match, determining that the partially-activated SIM qualifies for on-device activation.

10. The system of claim 8, wherein the SIM data includes an integrated circuit card identifier (ICCID) and the device data includes an international mobile equipment identify (IMEI).

11. The system of claim 8, the operations further comprising preventing access by the mobile device to the other web pages not including the activation portal web page prior to provisioning the mobile device within the mobility network.

12. The system of claim 8, wherein the SIM data and device data are automatically provided to the activation portal web page in response to activation of the URL and the SIM data and the device data are provided to the activation portal independent of user interaction.

13. The system of claim 8, wherein the mobile device is independent of internet access prior to activating the SIM and provisioning the mobile device within the mobility network.

14. The system of claim 8, the operations further comprising in response to activation of the URL, providing, to the mobile device, access to only the activation portal web page associated with the URL.

15. One or more non-transitory computer-readable storage media embodying instructions that, when executed by a processor, cause the processor to perform operations, comprising:

receiving, from a mobile device, a request to register with a mobility network, the mobile device including a partially-activated SIM;

determining that the partially-activated SIM qualifies for on-device activation;

in response to determining that the partially-activated SIM qualifies for on-device activation, providing a short message service (SMS) message to the mobile device through the mobility network, the SMS message including a URL;

in response to activation of the URL, i) providing, to the mobile device, access to an activation portal web page associated with the URL, wherein SIM data and device data are automatically provided to the activation portal web page, and ii) preventing access by the mobile device to other web pages not including the activation portal web page; and receiving, from the mobile device, activation data, and in response, activating the SIM and provisioning the mobile device within the mobility network.

16. The computer-readable storage media of claim 15, wherein determining that the partially-activated SIM qualifies for on-device activation includes:

comparing an identifier of the partially-activated SIM with a table stored by a database, the table storing data identifying SIMs that qualify for on-device activation;

based on the comparing, identifying a match between the identifier of the partially-activated SIM and data identifying SIMs that qualify for on-device activation; and based on the match, determining that the partially-activated SIM qualifies for on-device activation.

17. The computer-readable storage media of claim 15, wherein the SIM data includes an integrated circuit card identifier (ICCID) and the device data includes an international mobile equipment identify (IMEI).

18. The computer-readable storage media of claim 15, the operations further comprising preventing access by the mobile device to the other web pages not including the activation portal web page prior to provisioning the mobile device within the mobility network.

19. The computer-readable storage media of claim 15, wherein the SIM data and device data are automatically provided to the activation portal web page in response to activation of the URL and the SIM data and the device data are provided to the activation portal independent of user interaction.

20. The computer-readable storage media of claim 15, wherein the mobile device is independent of internet access prior to activating the SIM and provisioning the mobile device within the mobility network.

\* \* \* \* \*